United States Patent [19]

Hady et al.

[11] Patent Number: 6,026,139
[45] Date of Patent: Feb. 15, 2000

[54] METHOD AND APPARATUS FOR GENERATING A FREQUENCY DISTRIBUTION REPRESENTATION USING INTEGRATED COUNTER-BASED INSTRUMENTATION

[75] Inventors: Frank T. Hady; C. Brendan S. Traw, both of Portland, Oreg.

[73] Assignee: Intel Corporation, Santa Clara, Calif.

[21] Appl. No.: 09/098,412

[22] Filed: Jun. 16, 1998

[51] Int. Cl.[7] .................................................. G06M 3/08
[52] U.S. Cl. ............................ 377/13; 377/15; 377/16; 377/44
[58] Field of Search ................................ 377/13, 15, 16, 377/44

[56] References Cited

U.S. PATENT DOCUMENTS

| | | | |
|---|---|---|---|
| 4,536,646 | 8/1985 | Adams et al. | 377/14 |
| 5,138,638 | 8/1992 | Frey | 377/6 |
| 5,396,635 | 3/1995 | Fung | 395/800 |
| 5,926,518 | 7/1999 | Asokawa | 377/6 |

*Primary Examiner*—Margaret R. Wambach
*Attorney, Agent, or Firm*—Cindy T. Faatz

[57] ABSTRACT

Integrated counter-based instrumentation for generating a frequency distribution representation such as a histogram. An integrated circuit device includes an event counter to count a number of a predetermined type of events detected in each of a plurality of measurement periods during a first sub-experiment period. A frequency counter coupled to the event counter is to be incremented at the end of each measurement period if the number counted by the event counter meets a first test. A count stored in the frequency counter is provided to a frequency distribution data store at the end of the first sub-experiment period.

29 Claims, 5 Drawing Sheets

METHOD AND APPARATUS FOR GENERATING A FREQUENCY DISTRIBUTION REPRESENTATION USING INTEGRATED COUNTER-BASED INSTRUMENTATION

BACKGROUND OF THE INVENTION

1. Field of the Invention

The present invention relates to the field of performance analysis and tuning, and more particularly, to the field of generating a frequency distribution representation, such as a histogram, using counter-based instrumentation.

2. Discussion of Related Art

For system performance tuning, it is helpful to be able to measure particular characteristics of the system to be tuned to see where improvements can be made. Two types of instrumentation have typically been used to measure various system characteristics: 1) counter-based instrumentation and 2) trace-based instrumentation.

Conventional counter-based instrumentation uses a single counter to count a number of events over a given sample period. This conventional counter-based instrumentation is typically small enough to be included on various types of integrated circuit devices such that it is possible to collect data from physically inaccessible (e.g. internal) signals. This approach presents a drawback, however, in that only average metrics, such as throughput, may be measured using a counter alone.

A different type of counter-based circuitry is described in co-pending U.S. patent application Ser. No. 08/768,913 to Kardach, filed on Dec. 17, 1996 and assigned to the assignee of the present invention (Attorney Docket Number 42390.P3689) ("the Kardach application"). The counter-based circuitry described in the Kardach application is capable of detecting bus utilization over a given sample period in order to determine whether to reset a standby timer. The counter-based circuitry of the Kardach application, however, does not provide for the generation of a frequency distribution representation of a particular metric across a particular variable range. Thus, the counter-based circuitry described in the Kardach application may have limited utility in the context of system performance tuning.

In contrast to counter-based instrumentation, trace-based instrumentation uses external hardware that is capable of probing the system to be measured, and collecting and storing long traces. Conventional trace-based instrumentation typically also includes some means for post-processing the collected traces into useful data and/or charts. More complex metrics, such as distributions across a variety of operating conditions, may be gathered using trace-based instrumentation versus counter-based instrumentation.

Trace-based instrumentation, however, can be expensive. A relatively large memory may be required to store the collected traces if the experiment is long, for example. Further, some of the signals that are desired to be measured may be physically inaccessible to external hardware.

SUMMARY OF THE INVENTION

A method and apparatus for generating a frequency distribution representation using integrated counter-based instrumentation is described.

For one embodiment, an integrated circuit device includes an event counter to count a number of a predetermined type of events detected in each of a plurality of measurement periods during a first sub-experiment period. A frequency counter coupled to the event counter is to be incremented at the end of each measurement period if the number counted by the event counter meets a first comparative test. A count stored in the frequency counter is to be provided to a frequency distribution data store at the end of the first sub-experiment period.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

A method and apparatus for generating a frequency distribution representation using integrated counter-based instrumentation are described. In the following description, a histogram is used as an example of a frequency distribution representation that may be produced in accordance with various embodiments. It will be appreciated by those skilled in the art, however, that other types of frequency distribution representations are also within the scope of one or more embodiments.

Also, in the following description, the integrated counter-based instrumentation of one embodiment is described as being located on a particular integrated circuit device in a computer system. It will be appreciated that, for alternative embodiments, the integrated counter-based instrumentation may be configured on another type of device and/or a device for use in another type of system.

Figure 1:
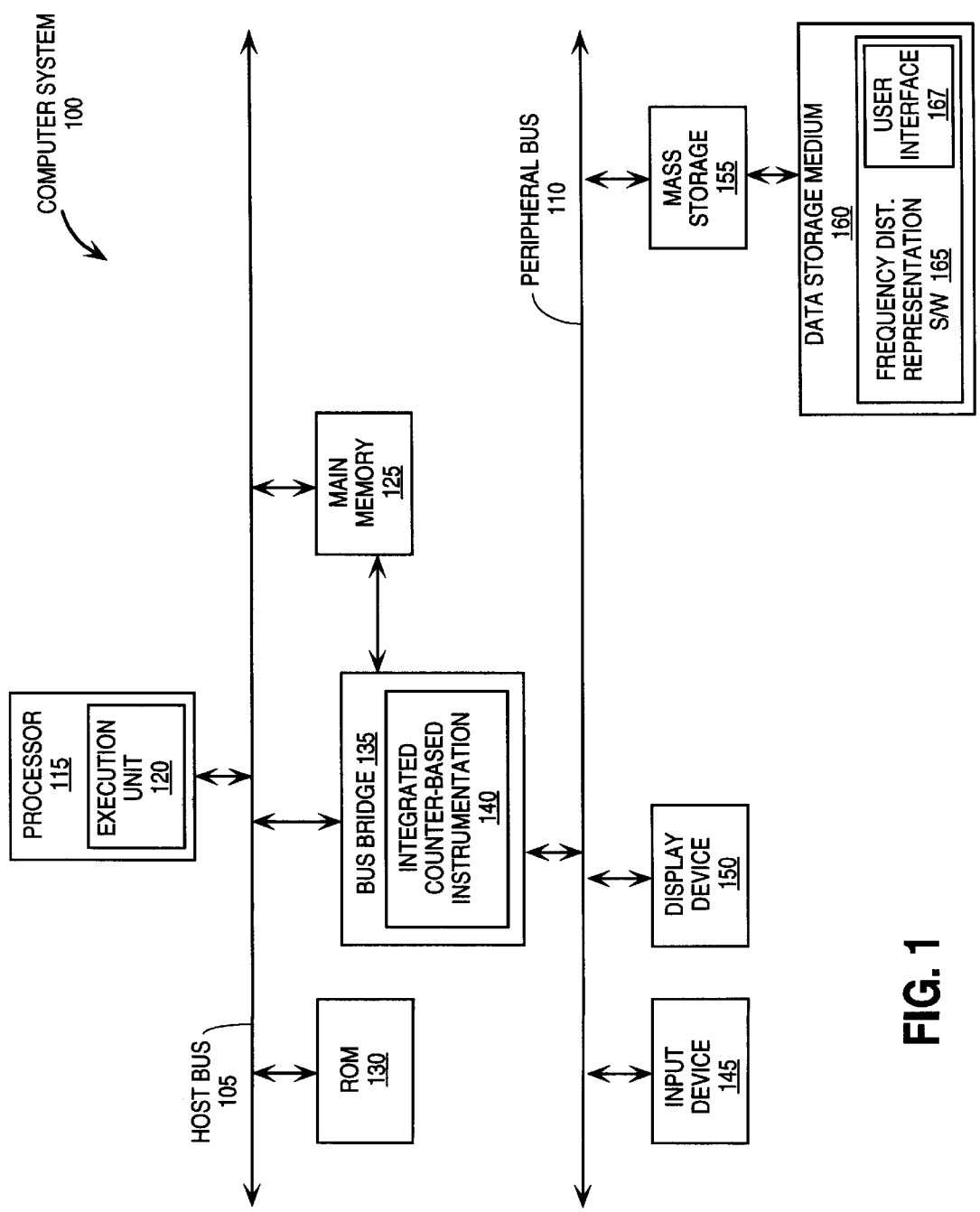
FIG. 1 is a block diagram of a computer system for which particular metrics may be analyzed using the integrated counter-based instrumentation of one embodiment.

FIG. 1 is a block diagram showing a system 100 for which particular metrics may be measured using the counter-based instrumentation of one embodiment. The system 100 is a computer system, however, other types of systems, or computer systems configured in another manner, may be used for alternative embodiments. The computer system 100 includes a host bus 105 and a peripheral bus 110. For one embodiment, the peripheral bus 110 is a Peripheral Components Interconnect (PCI) bus.

A processor 115 is coupled to the host bus 105 and includes an execution unit 120 to execute instructions. A main memory 125 is coupled to the host bus 105 to store information and instructions for use by the processor 115. Also coupled to the bus 105 are a read only memory (ROM) 130 to store nonvolatile information for use by the processor 115 and a bus bridge device 135 to communicate information between the host bus 105 and the peripheral bus 110. The bus bridge 135 is also coupled to the peripheral bus 110 and may perform other functions such as memory access control for the main memory 125, for example. The bus bridge 135 of one embodiment includes integrated counter-based instrumentation 140 which is described in more detail below with reference to FIG. 2.

Also coupled to the peripheral bus 110 of one embodiment is an input device 145, such as a keyboard and/or cursor control device, a display device 150, such as a monitor or liquid crystal display, and a mass storage device 155.

The computer system 100 may also include a data storage medium 160 corresponding to the mass storage device 155. For example if the mass storage device 155 is a CD ROM drive, the data storage medium 160 may be a compact disc read-only memory (CD ROM). If the mass storage device 155 is a disk drive, the data storage medium 160 may be a disk corresponding to the type of drive.

For one embodiment, the data storage medium 160 stores frequency distribution representation software 165. The frequency distribution representation software 165 of one embodiment includes a user interface 167. The user interface 167 may cause various prompts, menus, data entry fields and/or other information to be displayed on the display device 150. User input in response to the user interface may be provided through the one or more input devices 145.

The frequency distribution representation software 165 may be initially stored on the data storage medium 160 and then subsequently loaded into the main memory 125 for execution by the execution unit 120 of the processor 115. For alternative embodiments, the frequency distribution representation software 165 may be stored in another memory of the computer system 100. The function and operation of the frequency distribution representation software 165 is described in more detail below.

Figure 2:
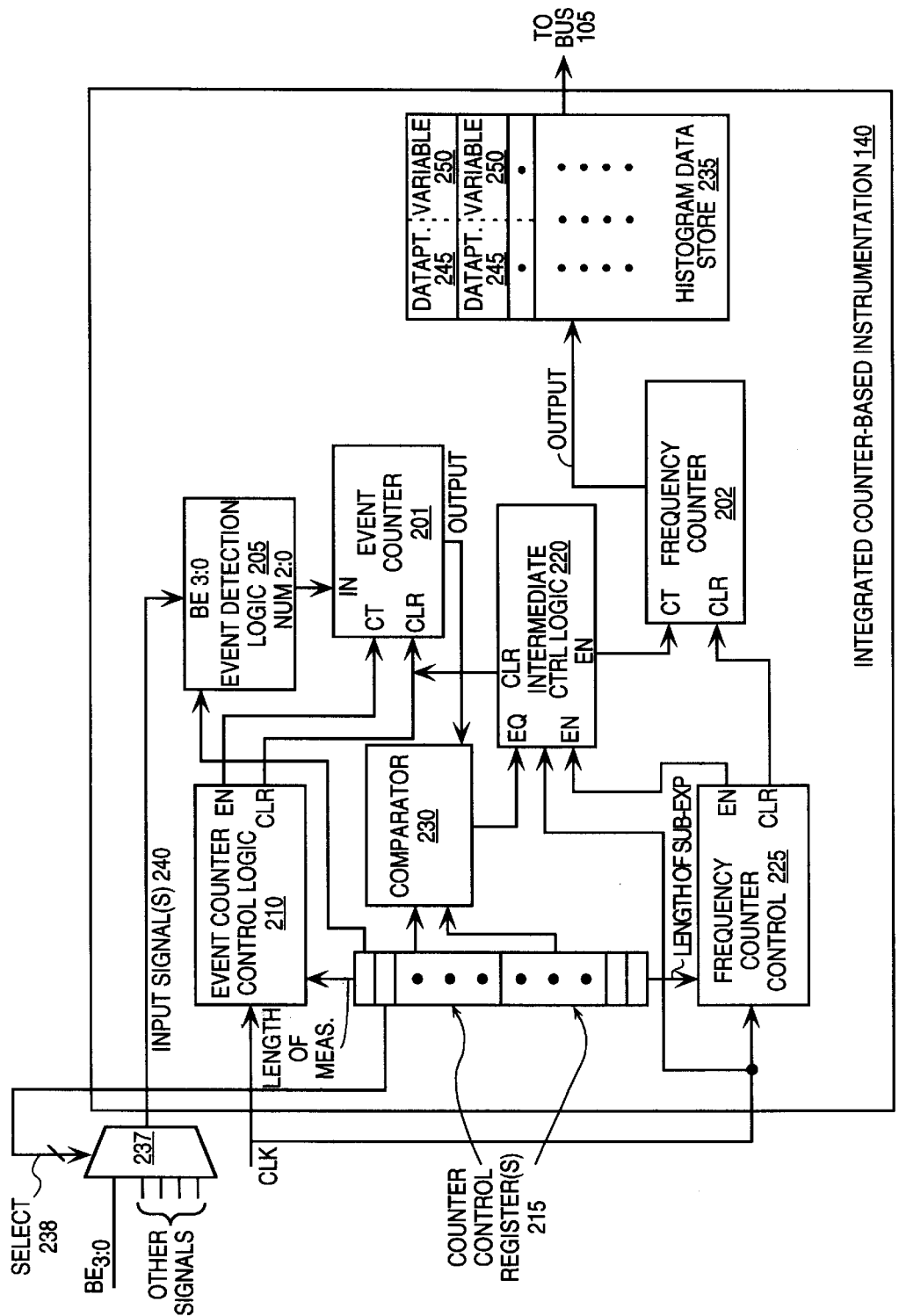
FIG. 2 is a block diagram showing the integrated counter-based instrumentation of FIG. 1 in more detail.

FIG. 2 is a block diagram showing one embodiment of the integrated counter-based instrumentation 140 of FIG. 1 in more detail.

The integrated counter-based instrumentation 140 of one embodiment includes an event counter 201 and a frequency counter 202. The event counter 201 and the frequency counter 202 may each be 32-bit counters, for one embodiment. It will be appreciated that, for alternative embodiments, a different type or size of counter may be used for the event counter 201 and/or the frequency counter 202.

Event detection logic 205, event counter control logic 210, and one or more counter control registers 215 are coupled to the event counter 201 to control its operation. Intermediate control logic 220, frequency counter control logic 225, and one or more of the counter control registers 215 work together to control the operation of the frequency counter 202. A clock signal CLK such as an internal chipset clock signal or another type of clock signal is coupled to the event counter control logic 210, the frequency counter control logic 225, and the intermediate control logic 220 for one embodiment. A comparator 230 is coupled to the counter control registers 215, the event counter 201 and the intermediate control logic 220. The term comparator as it is used herein refers broadly to logic that is capable of performing one or more of the following comparative functions: 1) determining whether a first value is equal to a second value, 2) determining whether a first value is less than a second value, 3) determining whether a first value is greater than a second value and/or 4) determining whether a first value is between a second value and a third value. A histogram data store 235 is coupled to an output of the frequency counter 202.

The integrated counter-based instrumentation 140 can be used to measure many different types of metrics depending on the input signals it is coupled to receive. For some embodiments, the integrated counter-based instrumentation may be selectively coupled to receive different signals at different times through a multiplexor 237 or other type of selection logic. In this manner, a single integrated counter-based instrumentation circuit, such as the integrated counter-based instrumentation circuit 140, may be used to measure a variety of different types of metrics by selectively altering the signals to which the circuit is coupled.

The operation of the integrated counter-based instrumentation 140 of one embodiment is described with continuing reference to FIGS. 1 and 2. For purposes of illustration, the embodiment of the integrated counter-based instrumentation 140 described with reference to FIG. 2 receives byte enable input signals (BE 3:0) from the peripheral bus 110 (FIG. 1). Byte enable signals BE 3:0 on the peripheral bus 110 indicate the particular bytes that are enabled to be transferred during a particular bus burst transfer. For example, if BE0 and BE1 are enabled, two bytes (the first and second bytes) are enabled to be transferred.

In this example, the integrated counter-based instrumentation 140 is being used to gather data for a histogram showing bus burst distribution during a particular experiment period.

The byte enable signals (BE 3:0) may be selectively received by asserting particular select signals 238 corresponding to the multiplexor 237 that come from the counter control register 215 for one embodiment. Alternatively, the integrated counter-based instrumentation 140 may be directly coupled to receive the byte enable signals (BE 3:0) from the peripheral bus 110 or connected to another signal of interest using the multiplexor 237 (FIG. 1).

Where the byte enable signals are selectively directed to the integrated counter-based instrumentation 140, the selection of the signals to be communicated over the bus 240 may be controlled and/or programmed into the counter control register 215 through the user interface 167 or another user-accessible means. For such embodiments, the frequency distribution representation software 165, including the user interface 167, may be loaded from the data storage medium 160 to the main memory 125. The processor execution unit 120 may then execute the instructions included in the frequency distribution representation software 165 from the main memory 125. Upon execution, the frequency distribution representation software 165 responds to user inputs provided through the input device 145 to control the experiment in the manner desired.

Whether selectively or directly routed to the counter-based instrumentation 140, the byte enable signals (BE 3:0) are provided to the event detection logic 205 over the bus 240.

Prior to beginning the desired measurement, the event counter control logic 210 is responsive to an initiating event to clear both the event counter 201 and the frequency counter 202. For one embodiment, the initiating event may be originated by the frequency distribution representation software 165 in response to user input. Alternatively, the initiating event may be a discrete event such as a system reset event, for example.

Following the initiating event, the event counter control logic 210 enables the event counter 201 to count.

Once the experiment begins, the event detection logic 205 determines from the input signals received over the bus 240, the events to be counted. For this example, each byte transfer, is considered an event. The event detection logic 205 determines from the BE 3:0 signals the burst size, or number of bytes transferred over the bus 110 in a particular transfer. Thus, if three out of four of the BE 3:0 signals are asserted, the event detection logic 205 determines that three bytes are to be transferred in the corresponding burst transfer.

The determined number is then provided to the event counter 201 input in the form of a binary representation. In response to receiving the determined number at its input, a number stored in the event counter 201 (0 at the beginning of the experiment) is incremented by the determined number.

The event detection logic 205 continues to provide the number of bytes transferred for each transfer during a first measurement period in this example. During the first measurement period, the event counter 201 continues to accumulate the number of bytes detected for each transfer by the event detection logic 205.

The end of the first measurement period is indicated by a measurement stop condition. For one embodiment, the length of the first measurement period is controlled by the event counter control logic 210 in response to a measurement period stored in one of the programmable counter control registers 215 for one embodiment. The measurement period may be programmed in the counter control registers 215 through the user interface 167 or in another user-accessible manner. The measurement period may be expressed in terms of a particular number of clock cycles, for example. Alternatively, given start and/or stop condition(s) may be indicated in the counter control register(s) 215 such that the measurement period begins at the indicated start condition and/or proceeds until the predetermined stop condition is reached. Examples of start and/or stop conditions may include a reset signal or a particular signal from the processor, for example.

Referring back to FIG. 2, at the end of the first measurement period, the cumulative number of bytes counted by the event counter 201 is communicated to the comparator 230. The comparator 230 then determines whether the number of bytes counted by the event counter 201 meets a first comparative test corresponding to a first reference value stored in the counter control register(s) 215. Like the first measurement period, the first reference value may also be selectively programmed into the counter control register(s) 215 through the user interface 167, or in another manner.

For one embodiment, the first comparative test determines whether the number of events counted by the event counter 201 during the first measurement period is equal to the first reference value stored in the counter control register(s) 215. For alternative embodiments, or for different types of experiments, the first comparative test may determine whether the number of events counted by the event counter 201 is greater than, less than, greater than or equal to, or less than or equal to the first reference value, for example. The particular test to be performed may be depend on the particular experiment being performed and/or the type or granularity of frequency distribution information desired, for example.

For some embodiments, the counter control register(s) 215 may also store a mask which may also be selectively programmed into the counter control register(s) 215 through the user interface 167. The mask may be applied to the cumulative number of events counted by the event counter 201 to provide for comparison to a particular power of two. For such embodiments, after the mask is applied, the resulting number is compared to the first reference value to determine whether the resulting number matches the first reference value.

The result of the first test, whether or not a mask is used, determines whether an EQUAL (EQ) input of the intermediate control logic 220 is asserted. If the first test is met, the EQ input is asserted. In response to assertion of the EQ input, for one embodiment, the intermediate control logic 220 causes the frequency counter 202 to be incremented.

Alternatively, if the number of bytes counted by the event counter 201 during the first measurement period does not meet the first test, the frequency counter 202 is not incremented.

Once it is determined whether or not the frequency counter 202 is to be incremented, the intermediate control logic 220 causes the event counter 201 to be cleared. The event counter control logic 210 then starts a second measurement period similar to the first measurement period described above. During the second measurement period, the event detection logic 205 again detects the number of bytes enabled for each bus burst transfer in the manner described above until the end of the second measurement period. For one embodiment, the first and second measurement periods are equal.

The same process described above is also repeated once the end of the second measurement period is reached. Again, the frequency counter 202 is incremented if the number of bytes counted by the event counter 201 (with the mask applied if appropriate) meets the first test corresponding to the first reference value stored in the counter control register(s) 215.

Multiple measurement periods may be repeated in a similar manner during a larger, sub-experiment period. Thus, during the sub-experiment period, the frequency counter 202 accumulates a number indicating the number of measurement periods for which the number counted by the event counter 101 met the first test.

The sub-experiment period is controlled by the frequency counter control logic 225 in response to a sub-experiment period indicated in the counter control register(s) 215. The frequency counter control logic 225 controls enabling of the frequency counter 202 to count at the beginning of each sub-experiment period.

The sub-experiment period may be expressed in terms of a certain number of clock cycles, a given number of measurement periods or in terms of particular event(s) corresponding to a sub-experiment start and/or stop condition. In whatever manner the sub-experiment period is expressed, the sub-experiment period may be programmed into the counter control register(s) 215 through the user interface 167 or in another user-accessible manner.

At the end of the sub-experiment period, the value accumulated in the frequency counter 202 is forwarded to the histogram data store 235 to indicate one data point in a histogram. The value accumulated by the frequency counter 202 in this example indicates a number of measurement periods for which the number of bytes counted by the event counter 201 (with the mask applied as appropriate) met the first test as determined by the comparator 230. Once the count accumulated in the frequency counter 202 is forwarded to the histogram data store 235, the frequency counter control logic 225 also controls clearing of the frequency counter 202 prior to the beginning of a subsequent sub-experiment period.

Multiple sub-experiment periods may be repeated in a similar manner with different reference values, masks and/or measurement or sub-experiment periods being programmed into the counter control register(s) 215 for each sub-experiment. The variables may be programmed into the counter control register(s) 215 at the beginning of the experiment with a different variable being used for each sub-experiment period. Alternatively, the variables may be re-programmed following each sub-experiment period.

At the end of each sub-experiment period, for this embodiment, the result stored in the frequency counter 202 is communicated to the histogram data store 235 to represent a single point in the desired histogram or other frequency distribution representation. The number of sub-experiments periods in a particular experiment may be determined by the range of variables to be analyzed, the size of the histogram data store 235 or other factors. Thus, the output of the counter-based instrumentation 140 that is stored in the histogram data store 235 at the end of an experiment is a frequency distribution of the occurrences of specific values of an underlying measurement. These underlying measurements can be of events, rates, bandwidths, etc.

Once the experiment has been completed and each desired data point has been provided to the histogram data store 235 in the manner described above, a histogram can be developed.

The histogram data store 235 of one embodiment is arranged such that each data point 245 from the frequency counter 202 is stored with its corresponding variable 250 at the end of each sub-experiment period. For example, where it is the reference value that is changed for each sub-experiment period, the reference value used during each particular sub-experiment period is stored along with the corresponding data point from the frequency counter 202. In this manner, when the experiment has been completed, each data point 245 and its corresponding variable 250 are readily available to the frequency distribution representation software 167 or other frequency distribution representation tools.

For an alternative embodiment, the histogram data store 235 stores only the data point corresponding to each sub-experiment and not its corresponding variable. The corresponding variable in this embodiment is extracted from the counter control register(s) 215 or from another memory.

For one embodiment, in executing the frequency distribution representation software 165, the data points 245 and corresponding variables 250 stored in the histogram data store 235 are forwarded to the processor 115 via the bus 105. The processor 115 then executes instructions in the frequency distribution representation software 165 that process the data points 245 along with their corresponding variables 250 to provide a graphical frequency distribution representation. The frequency distribution representation software 165 may facilitate preparation of such a graphical representation using any one of a number of types of graphical software. For example, Excel(TM) from Microsoft Corporation of Redmond, Wash. may be used for one embodiment to prepare a histogram from the data gathered. Alternatively, custom code may be used to prepare the desired frequency distribution representation based on the gathered data.

Figure 3:
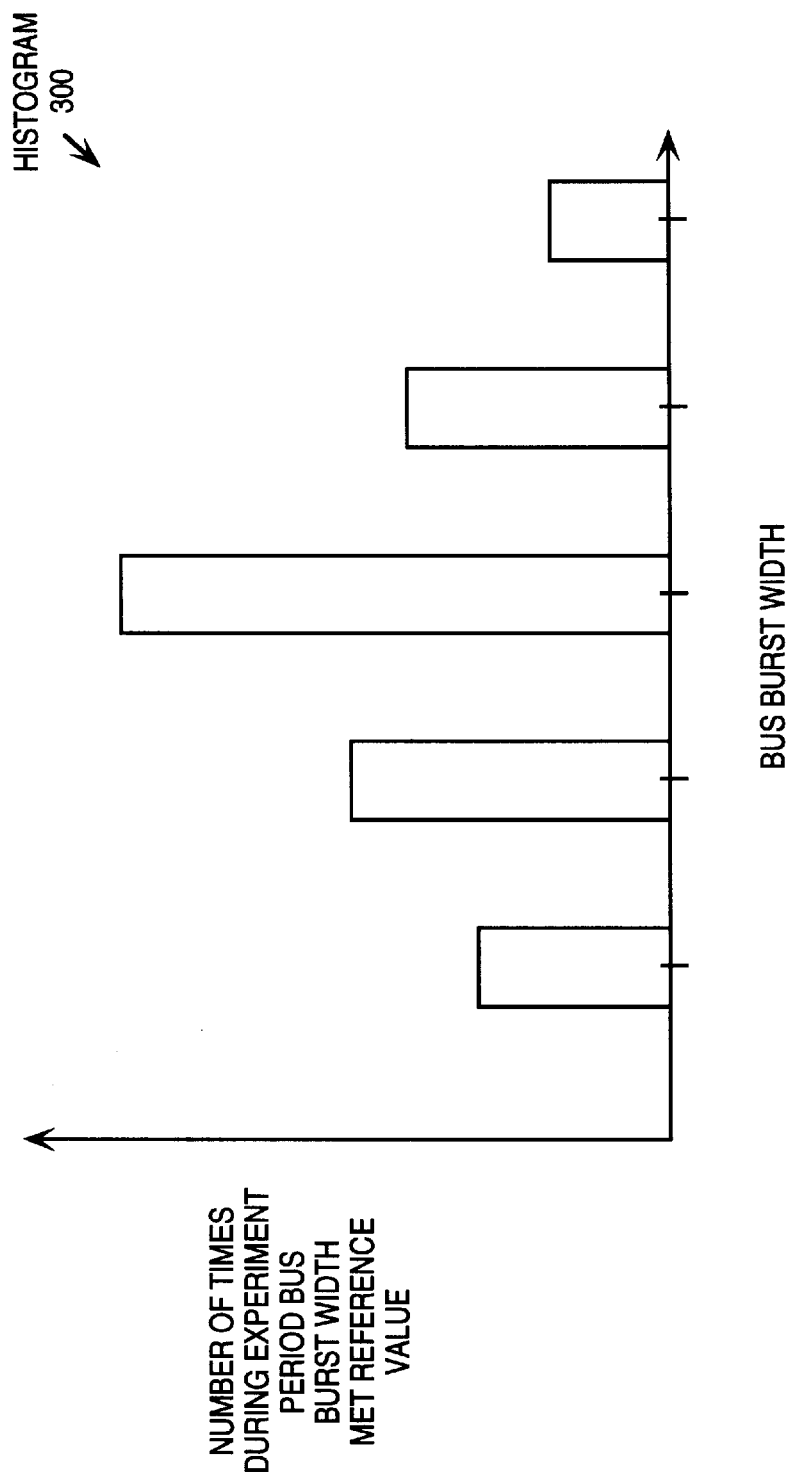
FIG. 3 shows an example of a histogram that may be generated using the integrated counter-based instrumentation of FIG. 2.

FIG. 3 shows an example of a histogram 300 that may be developed using the integrated counter-based instrumentation 140 and frequency distribution representation software 165 of one embodiment. Each of the vertical bars 305 of the histogram 300 represents one of the data points 245 stored in the histogram data store 235 from the frequency counter 202 (both shown in FIG. 2). The location of each vertical bar along the X axis corresponds to the particular variable 250 associated with the data point 245. For example, where it is the reference value that is varied from sub-experiment to sub-experiment, the location of each vertical bar along the X axis corresponds to the reference value used during the particular sub-experiment.

It will be appreciated that for other embodiments, a different type of frequency distribution representation may be created based on the data gathered by the integrated counter-based instrumentation 140 (FIG. 2) and/or the parameters that are varied from sub-experiment to sub-experiment, for example.

Figure 4:
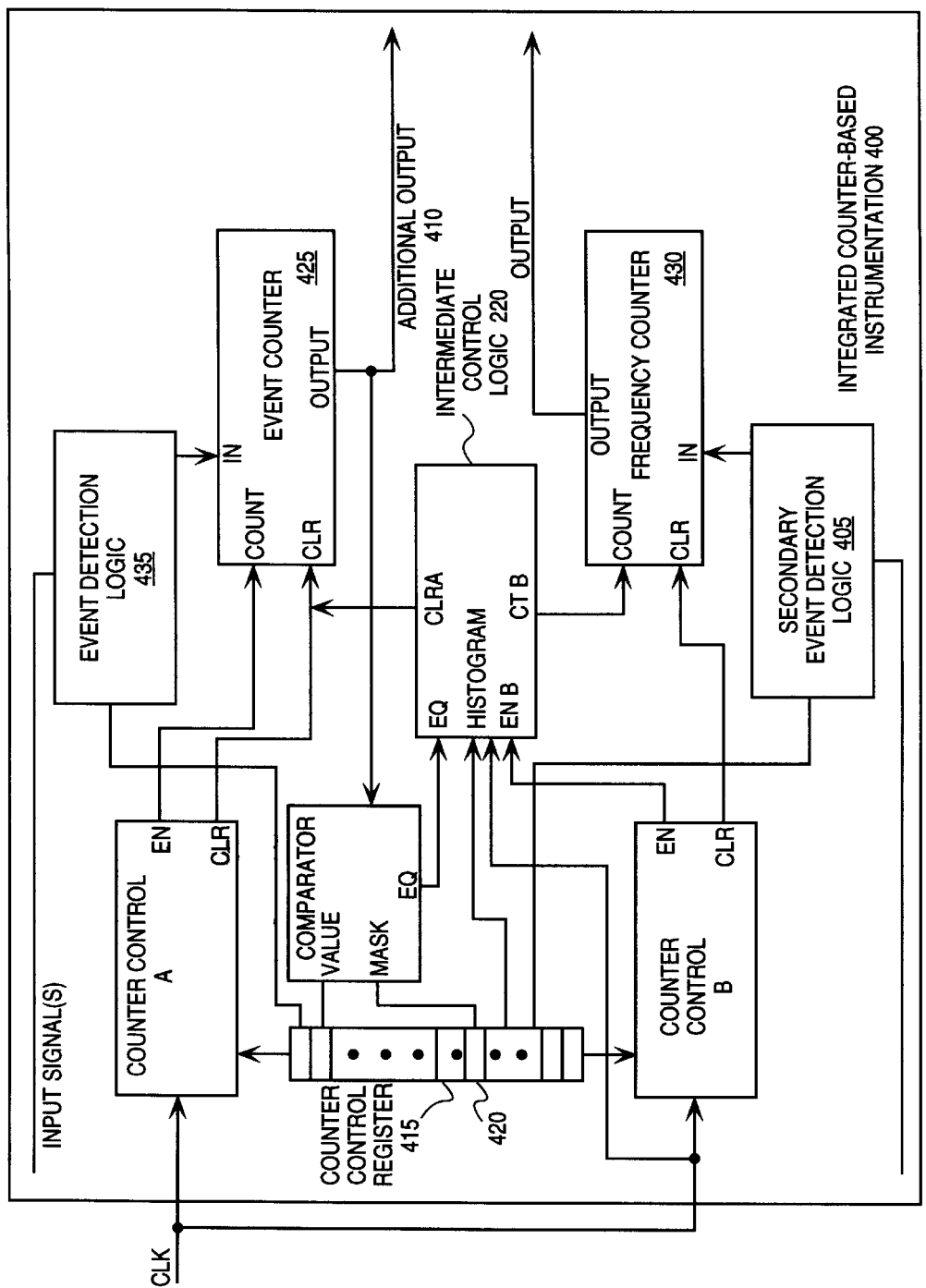
FIG. 4 is a block diagram showing the integrated counter-based instrumentation of an alternative embodiment.

Integrated counter-based instrumentation 400 of an alternative embodiment is shown in FIG. 4. Logic blocks in FIG. 4 having names similar to those shown in FIG. 2 operate in a similar manner to the corresponding blocks. The integrated counter-based instrumentation 400 of FIG. 4 may be used in place of the integrated counter-based instrumentation 140 of FIGS. 1 and 2 in a computer system similar to the computer system 100 of FIG. 1, for example.

The integrated counter-based instrumentation 400, in addition to the blocks corresponding to those shown in FIG. 2 includes secondary event detection logic 405 and an additional event counter output 410.

Also for this embodiment, the counter control register 415 includes a histogram bit 420. The histogram bit 420 is programmable through a user interface of frequency distribution representation software (not shown), for example, or in another user-accessible manner.

If the histogram bit 420 is set, the integrated counter-based instrumentation 400 operates in a manner similar to the integrated counter-based instrumentation 140 described with reference to FIG. 2. Thus, if the histogram bit 420 is set, the event counter output 410 and the secondary event detection logic 405 may not be used.

Alternatively, if the histogram bit 420 is not set, the event counter 425 and the frequency counter 430 can be used as individual counters. In this manner, the integrated counter-based instrumentation 400 can provide two independently operating counters 425 and 430 that can operate simultaneously to produce different average metrics. For this embodiment, the secondary event detection logic 405 may be configured to detect a different type of event than the event detection logic 435, for example. Further, different measurement periods can be programmed in the counter control registers 415 for each of the different counters 425 and 430.

Thus, for example, the event counter 425 may be used to measure bus throughput over a first measurement period while the frequency counter 430 is used to measure a different average metric over a second, different measurement period.

In this manner, the embodiment described with reference to FIG. 4 provides the flexibility to use the integrated counter-based instrumentation 400 in either of the above configurations depending on the status of the histogram bit 420.

It will be appreciated by those skilled in the art that for different embodiments different types of metrics may be measured other than the metrics described above. It will also be appreciated that other types of frequency distribution representations may also be developed in accordance with various embodiments. Further, for some embodiments, the frequency distribution representation software 165 (FIG. 2) may provide for a range of different types of frequency distribution representations from which a user may select a desired representation.

Figure 5:
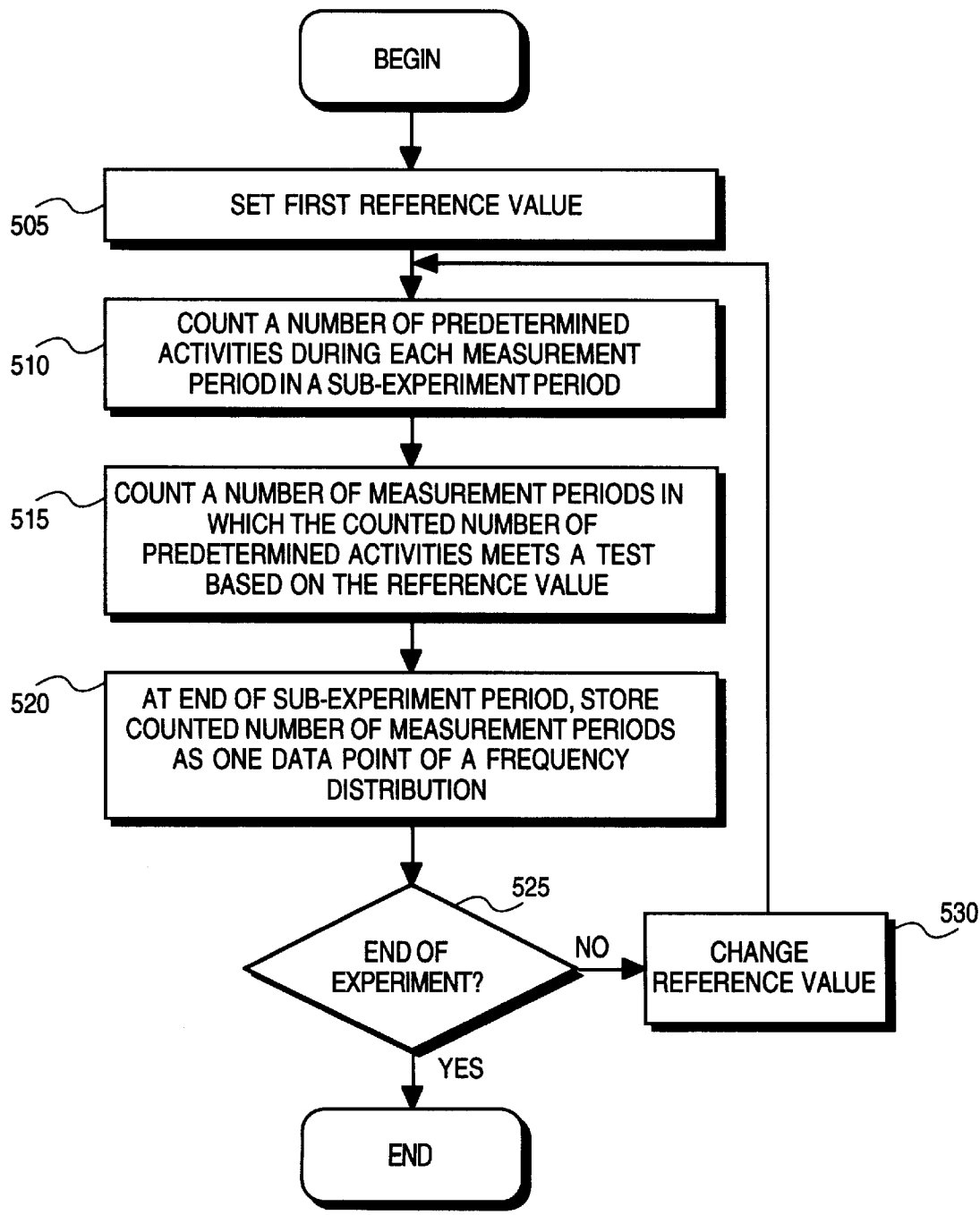
FIG. 5 is a flow diagram showing the method of one embodiment for generating a frequency distribution representation.

FIG. 5 is a flow diagram showing one embodiment of a method for producing a histogram. In step 505, a first reference value is set. In step 510, a number of predetermined activities during each measurement period in a longer, sub-experiment period is counted. In step 515, a number of measurement periods in which the counted number of predetermined activities meets a test based on the reference value is counted. At the end of the sub-experiment period, in step 520, the counted number of measurement periods is stored as one data point of a frequency distribution.

In decision block 525, it is determined whether the end of the experiment has been reached. If not, then in step 530, the reference value is changed and steps 510–520 are repeated using the new reference value to generate a second data point of the frequency distribution. This loop continues until the end of the experiment is reached.

In the foregoing specification, the invention has been described with reference to specific exemplary embodiments thereof. It will, however be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An integrated circuit device comprising:
    an event counter to count a number of a predetermined type of events detected in each of a plurality of measurement periods during a first sub-experiment period; and
    a frequency counter coupled to the event counter, the frequency counter to be incremented at the end of each measurement period if the number counted by the event counter meets a first comparative test, a count stored in the frequency counter to be provided to a frequency distribution data store at the end of the first sub-experiment period.

2. The integrated circuit device of claim 1 further including a comparator coupled to the event counter and the frequency counter, the comparator to determine whether the number counted by the first event counter at the end of each measurement period meets the first comparative test.

3. The integrated circuit device of claim 1 wherein the first comparative test includes a comparison to a first reference value, the integrated circuit device further including a counter control register coupled to the event counter, the counter control register being programmable to store the first reference value.

4. The integrated circuit device of claim 3 wherein the count provided to the frequency distribution data store at the end of the first sub-experiment period represents a first data point in a frequency distribution, the counter control register being further programmable to store a second reference value to be used during a second sub-experiment period, a count provided to the frequency distribution data store at the end of the second sub-experiment period representing a second data point in the frequency distribution.

5. The integrated circuit device of claim 1 further including a counter control register coupled to the event counter and the frequency counter, the counter control register being programmable to set the measurement period and the sub-experiment period.

6. The integrated circuit device of claim 1 further including a counter control register coupled to the event counter and the frequency counter, the counter control register being programmable to set a start and stop condition identifying the measurement period and a start and stop condition to identify the sub-experiment period.

7. The integrated circuit device of claim 5 further including first counter control logic responsive to the counter control register to enable the event counter at the beginning of each measurement period, the first counter control logic further to clear the event counter at the end of each measurement period after it is determined whether the number in the event counter meets the first test.

8. The integrated circuit device of claim 7 further including second counter control logic responsive to the counter control register to enable the frequency counter at the beginning of each sub-experiment period, the second counter control logic further to clear the frequency counter at the end of each sub-experiment period after the count in the frequency counter is provided to the frequency distribution data store.

9. The integrated circuit device of claim 1 further including event determination logic coupled to the event counter, the event determination logic to detect the predetermined type of event, the event determination logic further to cause the event counter to be incremented for each event detected.

10. The integrated circuit device of claim 1 further including a counter control register coupled to the event counter and the frequency counter, the counter control register including a histogram bit, setting of the histogram bit to enable the event counter and the frequency counter to operate independently and simultaneously, the event counter and the frequency counter each being capable of measuring an average metric when operating independently.

11. The integrated circuit device of claim 4 wherein the frequency distribution data store is configured to store the first and second data points and the corresponding reference values.

12. An integrated circuit device comprising:
    a counter control register that is programmable during an experiment to indicate first and second reference values, each of the first and second reference values to be used during a corresponding sub-experiment period; and
    counter logic coupled to the counter control register, the counter logic to generate a frequency distribution data point corresponding to each of the first and second reference values, each data point indicating a number of measurement periods during the corresponding sub-experiment period that a number of predetermined events detected met a comparative test, the comparative test using the corresponding reference value.

13. The integrated circuit device of claim 12 wherein the counter logic includes an event counter and a frequency counter, the event counter to count the number of predetermined events detected during each measurement period, the frequency counter to count the number of measurement periods during each sub-experiment period that the number counted by the event counter met the corresponding comparative test.

14. The integrated circuit device of claim 12 wherein the counter control register is further programmable to indicate the measurement period and the sub-experiment period.

15. The integrated circuit device of claim 13 further including first counter control logic coupled to the event counter and the counter control register, wherein the counter control register is further programmable to indicate the measurement period, the first counter control logic being responsive to the counter control register to enable the event counter at the beginning of each measurement period and to clear the event counter at the end of each measurement period after it is determined whether the number in the event counter met the corresponding comparative test.

16. The integrated circuit device of claim 13 further including second counter control logic coupled to the frequency counter and the counter control register, wherein the counter control register is further programmable to indicate the sub-experiment period, the second counter control logic being responsive to the counter control register to enable the frequency counter at the beginning of each sub-experiment period and to clear the frequency counter after each sub-experiment period prior to the beginning of a subsequent sub-experiment period.

17. The integrated circuit device of claim 12 further including a histogram data store, the histogram data store to store the first and second data points, the first and second data points to be used in preparing a frequency distribution representation.

18. The integrated circuit device of claim 12 wherein the counter control register is programmable through a user interface.

19. The integrated circuit device of claim 12 further including event detection logic coupled to the counter logic, the event detection logic being configured to detect the predetermined events.

20. The integrated circuit device of claim 19 further including a multiplexor coupled to the event detection logic, the multiplexor to enable the event detection logic to be selectively coupled to one or more signal lines.

21. A method for generating a frequency distribution comprising steps of:
    counting a number of predetermined activities during each measurement period in a sub-experiment period;
    counting the number of measurement periods in which the counted number of predetermined activities meets a comparative test based on a first value; and
    at the end of the sub-experiment period, storing the counted number of measurement periods as a first data point of the frequency distribution.

22. The method of claim 21 further including the steps of:
    changing the first value to a second value, and
    repeating the steps of counting a number of predetermined activities, counting the number of measurement periods, and using the counted number of measurement periods to generate a second point on the frequency distribution.

23. The method of claim 22 wherein the comparative tests based on the first and second values each include a step of determining whether the counted number of measurement periods matches the corresponding value.

24. The method of claim 22 wherein the comparative tests based on the first and second values each include the steps of:
    applying a mask to the counted number of measurement periods, and
    determining whether the masked counted number of measurement periods equals the corresponding value.

25. A computer system comprising:
    a bus to communicate information;
    a processor coupled to the bus, the processor including an execution unit to execute instructions;
    a memory coupled to the bus to store instructions for the processor;
    an integrated circuit device coupled to the bus, the integrated circuit device comprising:
        a counter control register that is programmable to indicate first and second reference values, each of the first and second reference values to be used during a corresponding sub-experiment period in an experiment; and
        counter logic coupled to the counter control register, the counter logic to generate a data point corresponding to each of the first and second reference values, each data point indicating a number of measurement periods during the corresponding sub-experiment period that a number of predetermined events detected met a comparative test, the comparative test using the corresponding reference value.

26. The computer system of claim 25 wherein the counter control register is further programmable to set the measurement period and the sub-experiment period.

27. The computer system of claim 26 wherein the counter control register is programmable through a user interface to be stored in the memory.

28. The computer system of claim 26 wherein the counter control register is programmable through a user interface stored on a data storage medium.

29. The computer system of claim 25 wherein the memory is configured to store frequency distribution representation software, the frequency distribution representation software to generate a frequency distribution representation using the first and second data points.

* * * * *